(12) United States Patent
Cohen et al.

(10) Patent No.: US 7,559,088 B2
(45) Date of Patent: Jul. 7, 2009

(54) METHOD AND APPARATUS FOR DELETING DATA UPON EXPIRATION

(75) Inventors: Gavin David Cohen, Pleasanton, CA (US); Donald Alvin Trimmer, Livermore, CA (US); Rico Blaser, San Francisco, CA (US)

(73) Assignee: NETAPP, Inc., Sunnyvale, CA (US)

( * ) Notice: Subject to any disclaimer, the term of this patent is extended or adjusted under 35 U.S.C. 154(b) by 795 days.

(21) Appl. No.: 11/051,952

(22) Filed: Feb. 4, 2005

(65) Prior Publication Data

US 2006/0143443 A1 Jun. 29, 2006

Related U.S. Application Data

(60) Provisional application No. 60/541,626, filed on Feb. 4, 2004, provisional application No. 60/542,011, filed on Feb. 5, 2004.

(51) Int. Cl.
*H04L 9/00* (2006.01)
(52) U.S. Cl. ............................................. 726/26; 726/1
(58) Field of Classification Search ....................... None
See application file for complete search history.

(56) References Cited

U.S. PATENT DOCUMENTS

| | | | |
|---|---|---|---|
| 4,635,145 A | 1/1987 | Horie et al. |
| 4,727,512 A | 2/1988 | Birkner et al. |
| 4,775,969 A | 10/1988 | Osterlund |
| 5,235,695 A | 8/1993 | Pence |
| 5,269,022 A | 12/1993 | Shinjo et al. |
| 5,297,124 A | 3/1994 | Plotkin et al. |
| 5,438,674 A | 8/1995 | Keele et al. |
| 5,455,926 A | 10/1995 | Keele et al. |
| 5,485,321 A | 1/1996 | Leonhardt et al. |
| 5,666,538 A | 9/1997 | DeNicola |
| 5,673,382 A | 9/1997 | Cannon et al. |
| 5,774,292 A | 6/1998 | Georgiou et al. |
| 5,774,643 A | 6/1998 | Lubbers et al. |
| 5,774,715 A | 6/1998 | Madany et al. |
| 5,805,864 A | 9/1998 | Carlson et al. |
| 5,809,511 A | 9/1998 | Peake |
| 5,809,543 A | 9/1998 | Byers et al. |

(Continued)

FOREIGN PATENT DOCUMENTS

CA 2 256 934 A1 6/2000

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Brandon S Hoffman
(74) *Attorney, Agent, or Firm*—Perkins Coie LLP

(57) ABSTRACT

A method and apparatus for efficiently deleting data including backup or snapshots upon expiration are disclosed. The data can be deleted even without physical access to the data. A data generation unit generates a data. Each data has an expiration time and should be deleted upon expiration. An encryption unit encrypts the data, and the encrypted data is stored in data storage. A controller monitors whether there is an expired data, and if there is an expired data, the controller deletes a key necessary for decrypting the expired data.

9 Claims, 2 Drawing Sheets

U.S. PATENT DOCUMENTS

| | | |
|---|---|---|
| 5,854,720 A | 12/1998 | Shrinkle et al. |
| 5,857,208 A | 1/1999 | Ofek |
| 5,864,346 A | 1/1999 | Yokoi et al. |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 5,974,424 A | 10/1999 | Schmuck et al. |
| 6,021,408 A | 2/2000 | Ledain et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,134,660 A * | 10/2000 | Boneh et al. ................. 713/193 |
| 6,163,853 A | 12/2000 | Dion et al. |
| 6,163,856 A | 12/2000 | Dion et al. |
| 6,173,293 B1 | 1/2001 | Thekkath et al. |
| 6,173,359 B1 | 1/2001 | Carlson et al. |
| 6,195,730 B1 | 2/2001 | West |
| 6,225,709 B1 | 5/2001 | Nakajima |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,397,307 B2 | 5/2002 | Ohran |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur |
| 6,654,912 B1 | 11/2003 | Viswanathan et al. |
| 6,658,435 B1 | 12/2003 | McCall |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 | 11/2004 | Carlson et al. |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 | 4/2005 | Hart et al. |
| 6,898,600 B2 * | 5/2005 | Fruchtman et al. ............ 707/10 |
| 6,915,397 B2 | 7/2005 | Lubbers et al. |
| 6,931,557 B2 | 8/2005 | Togawa |
| 6,950,263 B2 | 9/2005 | Suzuki et al. |
| 6,973,369 B2 | 12/2005 | Trimmer et al. |
| 6,973,534 B2 | 12/2005 | Dawson et al. |
| 6,978,283 B1 | 12/2005 | Edwards et al. |
| 6,978,325 B2 | 12/2005 | Gibble et al. |
| 7,020,779 B1 * | 3/2006 | Sutherland .................. 713/185 |
| 7,032,126 B2 | 4/2006 | Zalewski et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,111,136 B2 | 9/2006 | Yamagami |
| 7,111,194 B1 | 9/2006 | Schoenthal et al. |
| 7,127,388 B2 | 10/2006 | Yates et al. |
| 7,127,577 B2 | 10/2006 | Koning et al. |
| 7,152,077 B2 | 12/2006 | Veitch et al. |
| 7,152,078 B2 | 12/2006 | Yamagami |
| 7,155,465 B2 | 12/2006 | Lee et al. |
| 7,155,586 B1 | 12/2006 | Wagner et al. |
| 7,200,726 B1 | 4/2007 | Gole et al. |
| 7,203,726 B2 | 4/2007 | Hasegawa et al. |
| 7,346,623 B2 | 3/2008 | Prahlad et al. |
| 2001/0047447 A1 | 11/2001 | Katsuda |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0091670 A1 | 7/2002 | Hitz et al. |
| 2002/0095557 A1 | 7/2002 | Constable et al. |
| 2002/0144057 A1 | 10/2002 | Li et al. |
| 2002/0163760 A1 | 11/2002 | Lindsay et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0005313 A1 | 1/2003 | Gammel et al. |
| 2003/0037211 A1 | 2/2003 | Winokur |
| 2003/0046260 A1 | 3/2003 | Satyanarayanan et al. |
| 2003/0120476 A1 | 6/2003 | Yates et al. |
| 2003/0120676 A1 | 6/2003 | Holavanahalli et al. |
| 2003/0126136 A1 | 7/2003 | Omoigui |
| 2003/0126388 A1 | 7/2003 | Yamagami |
| 2003/0135672 A1 | 7/2003 | Yip et al. |
| 2003/0149700 A1 | 8/2003 | Bolt |
| 2003/0158766 A1 | 8/2003 | Mital et al. |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0103147 A1 | 5/2004 | Flesher et al. |
| 2004/0167903 A1 | 8/2004 | Margolus et al. |
| 2004/0181388 A1 | 9/2004 | Yip et al. |
| 2004/0181707 A1 | 9/2004 | Fujibayashi |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0097260 A1 | 5/2005 | McGovern et al. |
| 2005/0108302 A1 | 5/2005 | Rand et al. |

| | | | |
|---|---|---|---|
| 2005/0144407 | A1 | 6/2005 | Colgrove et al. |
| 2005/0182910 | A1 | 8/2005 | Stager et al. |
| 2005/0240813 | A1 | 10/2005 | Okada et al. |
| 2006/0010177 | A1 | 1/2006 | Kodama |
| 2006/0047895 | A1 | 3/2006 | Rowan et al. |
| 2006/0047902 | A1 | 3/2006 | Passerini |
| 2006/0047903 | A1 | 3/2006 | Passerini |
| 2006/0047905 | A1 | 3/2006 | Matze et al. |
| 2006/0047925 | A1 | 3/2006 | Perry |
| 2006/0047989 | A1 | 3/2006 | Delgado et al. |
| 2006/0047998 | A1 | 3/2006 | Darcy |
| 2006/0047999 | A1 | 3/2006 | Passerini et al. |
| 2006/0143376 | A1 | 6/2006 | Matze et al. |
| 2006/0259160 | A1 | 11/2006 | Hood et al. |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 | 4/2006 |
| EP | 1 671 231 | 6/2006 |
| EP | 1 671231 | 6/2006 |
| WO | WO99/03098 | 1/1999 |
| WO | WO99/06912 | 2/1999 |
| WO | WO-0118633 A1 | 3/2001 |
| WO | WO-03067438 A2 | 8/2003 |
| WO | WO-2004084010 A2 | 9/2004 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Continuous Data Protection: Business Continuity for the Era of Networked Storage: An Executive White Paper" Aberdeen Group, Inc. Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWeek, Mar. 24, 2003.
Baltazar, Henry "More Intelligence is on the Way" eWeek, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Creates 'Next Critical Step' in Disaster Recovery for Patrick Air Force Base, Securitus VTL Sets the Pace", Apr. 20, 2004.
"Alacritus to Demonstrate Chronospan CDP with the Brocade Fabric Application Platform at Storage Networking World", Apr. 1, 2004.
"Alacritus to Demo Chronospan Continuous Data Protection with the Cisco MDS 9000", Apr. 1, 2004.
"Alacritus and Network Appliance Deliver Advanced Virtual Tape Library, Solution Shortens Backup Windows, Accelerates Data Recovery, and Simplifies Backup Management", Dec. 7, 2004.
"Cisco and Storage ISVs to Demo Protocol-Based Interface between Storage Appliances and the Cisco MDS 9000", Mar. 30, 2004.
"Case Study Shizuoka-ken Noukyou Densan Center K.K., Reducing Management Costs Through Tapeless Backup At An iDC", Apr. 7, 2004.

"Alacritus Software's Securitus I: Pointing the Way to Virtual Tape Libraries" Aberdeen Group, Inc., Mar. 2002.

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the Way to Virtual Tape Libraries" Aberdeen Group, Inc., Jul. 2003.

"Alacritus Software's Securitus: Defining the Way to Virtual Tape Libraries" Aberdeen Group, Inc., Jul. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies backup Management", Dec. 7, 2004.

"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through tapeless Backup At An iDC", Apr. 7, 2004.

Joan Daemen et al., "AES Proposal: Rijndael", The Rijndael Block Cipher, Document Version 2, Mar. 1999, 45 pages.

Joan Daemen et al., "Note on Naming", Rijndael, Sep. 4, 2003, 2 pages.

Decru, "Decru Datafort E-Series Storage Security Appliances, Transparant Data Security for Network Attached Storage (NAS)", 2004, 2 pages.

Simon L. Garfinkel et al., "Rememberance of Data Passed: A Study of Disk Sanitization Practices", IEEE Security and Privacy, vol. 1, No. 1, 2003 19 pages.

Hatfield. "Write Read Verify Feature Set", May 14, 2004.

Chris Lueth, "Worm Storage on Magnetic Disks Using SnapLock Compliance™ and SnapLock Enterprise™", Network Applicance, Inc., Sep. 2003, sections 1-5 13 pages.

"Network Appliance Worm Storage Solution: SEC 17 a-4(f) Compliance Assessment", Network Appliance, Inc., Jul. 10, 2003, pp. 1-20.

Novell NetWare Server Disks And Storage Devices Administration Guide. Netware 5.1, Jan. 2000, pp. 1-60.

* cited by examiner

METHOD AND APPARATUS FOR DELETING DATA UPON EXPIRATION

CROSS REFERENCE TO RELATED APPLICATIONS

This application claims priority from U.S. provisional application nos. 60/541,626 filed Feb. 4, 2004 and 60/542,011 filed Feb. 5, 2004, which are incorporated by reference as if fully set forth herein.

FIELD OF INVENTION

The present invention relates to data generation and deletion. More particularly, the present invention is a method and apparatus for deleting data efficiently upon expiration. The present invention can be applied to any kind of data stored in any kind of system.

BACKGROUND

Backing up data is a process that generates a coherent copy of data. Backing up data has become more important as the amount of data has exploded in volume and the importance of electronic records has also greatly increased. Backups are performed for various reasons, such as to assure availability of data, to generate data archival, or to transport data to a distant location.

Many schemes have been developed to generate backup data. One data backup scheme is to generate point-in-time (PIT) copies of data. PIT copies which are generated are either hardware-based or software-based. A hardware-based PIT copy is a mirror of a primary volume which has been saved onto a secondary volume. A software-based PIT copy, called a "snapshot," is a "picture" of a volume at the block level or a file system at the operating system level. Another data backup scheme is where a backup application sends full or incremental copies of data to tape.

Backup data is generated in accordance with a data backup policy. Backup copies are generated and stored in a storage media, and maintained for a certain period of time. Often, not only is a single copy generated, but multiple copies of one original data are generated and maintained in separate media. Because of regulatory requirements, companies have to keep certain backup copies for several years. Accordingly, the data backup policy typically sets an expiration time for each backup data. For example, a system may retain daily snapshots or backups for two months, weekly snapshots or backups for two years and monthly snapshots or backups for seven years. Once the expiration time has passed, the backup copies are deleted completely from record, and should not be available in the future.

Historically, magnetic tape has been used as the storage medium for backing up data because tape has been a much cheaper medium than a disk. In order to completely delete backup data stored in a tape, a system operator typically needs to access each tape through the backup application, delete the backup data in question, and run another backup procedure on the tape. This is a labor-intensive and expensive process. This is even more complicated if only certain pieces of data on the tape need to be expired or if the tape can not be easily located.

One problem with these prior art scenarios is that even after the expiration time, many copies across many tapes are not deleted completely and are still in existence. This may cause a problem. For example, when critical data that should have been deleted is obtained by an adversary in a lawsuit, this may cause a tremendous damage to companies.

Therefore, there is a need to efficiently and completely delete all expired data from record in a way that it is no longer recoverable. This is the case even when it is not easy to obtain direct access to the data.

SUMMARY

A method and apparatus for deleting data including backup data or snapshots upon expiration are disclosed. The present invention can be applied even where it is not possible to gain physical access to the data. A data generation unit generates data, (including backup data or snapshots). Each data has an expiration time which sets forth the desired time that the data will be deleted. An encryption unit encrypts the data, and the encrypted data is stored in a storage. A controller monitors whether an expiration time has passed and, if so the controller deletes a key necessary for decrypting the expired data.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1A:
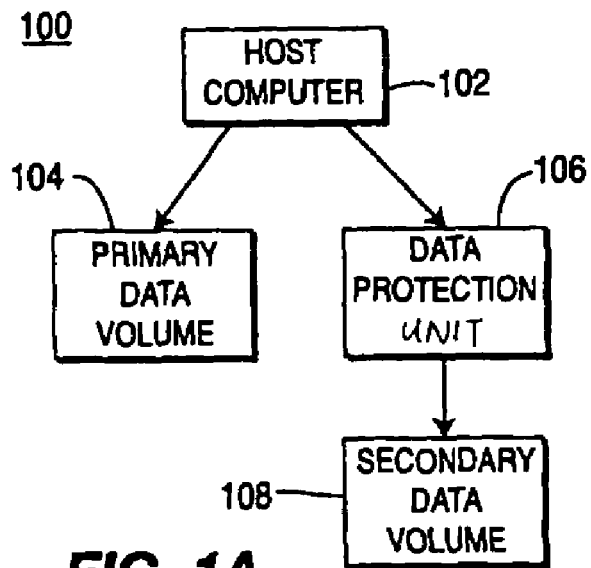
FIGS. 1A-1C are block diagrams of a data backup system in accordance with the present invention.

The present invention will be described with reference to the drawing FIGS. wherein like numerals represent like elements throughout.

FIG. 1A shows an example of a data backup system 100 that can be implemented in accordance with the present invention. The system 100 comprises a host computer 102, a primary data volume 104 (the primary data volume may also be referred to as a protected volume), a data protection unit 106, and a secondary data volume 108. The host computer 102 is coupled to the primary data volume 104 and to the data protection unit 106. The data protection unit 106 manages the secondary data volume 108, and generates and maintains backup data for data stored in the primary data volume 104. The configuration of the system 100 minimizes the lag time by writing directly to the primary data volume 104 and permits the data protection unit 106 to focus exclusively on managing the secondary data volume 108.

It should be noted that the primary data volume 104 and the secondary data volume 108 can be any type of data storage, including, but not limited to, a single disk, a disk array (such as a RAID), a tape drive, a tape library or a storage area network (SAN). The main difference between the primary data volume 104 and the secondary data volume 108 lies in the type of data that is stored on the device. The primary volume 104 is typically an expensive, fast, and highly available storage subsystem that stores the primary copy of the data, whereas the secondary volume 108 is typically a cost-effective, high capacity, and comparatively slow (for example, tape, ATA/SATA disks) storage subsystem that stores backup copies of the data.

Figure 1B:
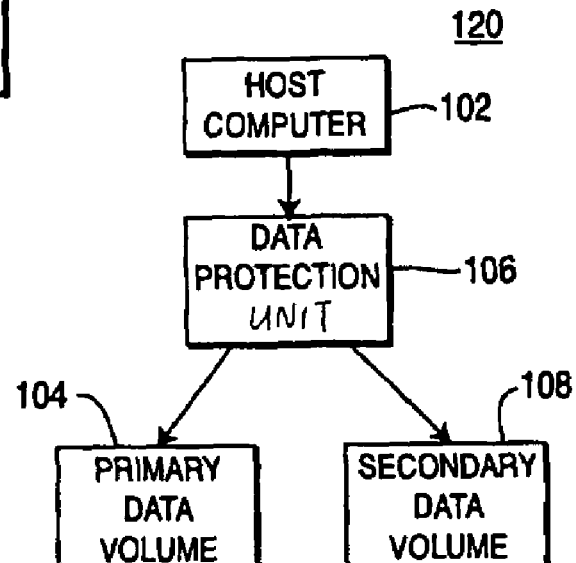

FIG. 1B shows an alternative example of a system 120 that can be implemented in accordance with the present invention. The host computer 102 is directly connected to the data protection unit 106, which manages both the primary data volume 104 and the secondary data volume 108. The system 120 may be slower than the system 100 described with reference to FIG. 1A since the data protection unit 106 must manage both the primary data volume 104 and the secondary data volume 108. Although slower operation results in a higher latency for writes to the primary volume 104 in the system 120 and lowers the available bandwidth for use, such a configuration as shown in FIG. 1B may be acceptable in certain applications.

Figure 1C:
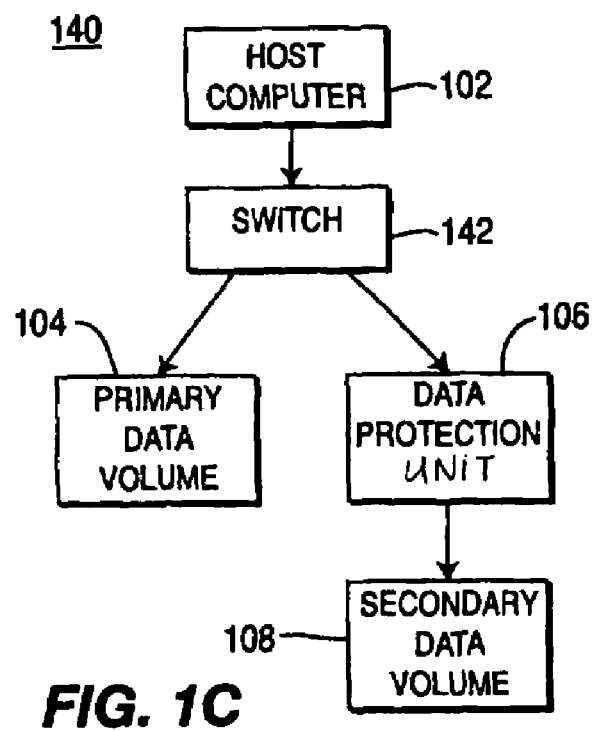

FIG. 1C shows another example of a system 140 that can be implemented in accordance with the present invention. The host computer 102 is connected to an intelligent switch 142. The switch 142 is connected to the primary data volume 104 and the data protection unit 106 which, in turn, manages the secondary data volume 108. The switch 142 includes the ability to host applications and contains some of the functionality of the data protection unit 106 in hardware, to assist in reducing system latency and improve bandwidth.

It should be noted that the configurations of the system shown in FIGS. 1A-1C are provided as an example, not as a limitation. The present invention can be applied not only to data backup systems but also to any kind of data generation system in which the generated data may need to be expired at some point. Hereinafter including FIGS. 2 and 3, the present invention will be explained with reference to a data backup system. However, it should be noted that it is obvious for those skilled in the art that the present can be equally applied to any data generation system and any kind of data, not limited to data backup system or backup data. Any other configuration, (e.g. a typical backup system, a virtual tape library or any other data generation system), may be implemented, and the data protection unit 106 operates in the same manner regardless of the particular configuration of the system 100, 120, 140. It should be also noted that the present invention may utilize only one data volume, instead of two, for storing an original data and/or a backup data. The primary difference between these examples is the manner and place in which a copy of each write is obtained. To those skilled in the art, it is evident that other embodiments, such as the cooperation between a switch platform and an external server, are also feasible. Accordingly, although two data volumes are shown, a single data volume may be used. Additionally, although two data volumes may be used, they may be stored on a single storage device.

Figure 2:
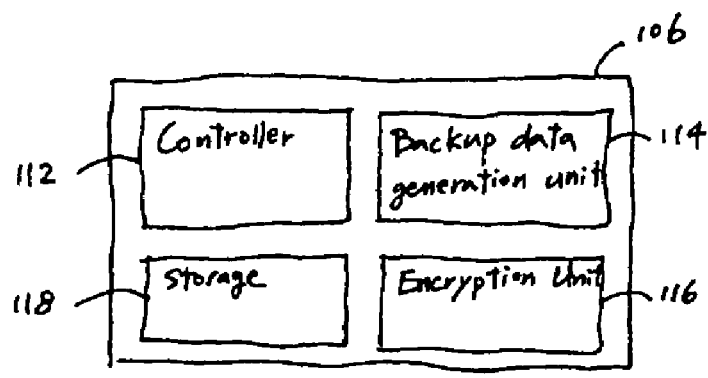
FIG. 2 is a block diagram of a data protection unit in accordance with the present invention.

FIG. 2 is a block diagram of the data protection unit 106 in accordance with the present invention. Backup data is generated, stored and deleted in accordance with a data backup policy. It should be noted that it is obvious to those skilled in the art that the present invention can be applied to any kind of data that needs to be retained and then expired, (e.g. archival data, financial data, email data, etc.). The data protection unit 106 controls generating, storing and deleting of backup data. The data protection unit 106 comprises a controller 112, a backup data generation unit 114, an encryption unit 116, and an encryption key storage 118.

The controller 112 provides overall control of generating, storing, and deleting backup data. The backup data generation unit 114 generates backup data, such as snapshots, under the control of the controller 112 as desired under the backup policy. The backup data is stored in a storage unit, such as a secondary volume 108 or tape. The backup data is input into the encryption unit 116. The encryption unit 116 performs both encryption of the backup data, and subsequent decryption of the encrypted backup data as necessary. Therefore, encrypted backup data is stored in storage, and the encrypted backup data may be restored from the storage in case of system failure. Encryption is performed by any means which is currently available or will be developed in the future.

The encryption unit 116 encrypts the backup data using an encryption key. The encryption key may be either a symmetric key or an asymmetric key. If a symmetric key is used, a same key is required for both encryption and decryption. If an asymmetric key is used, a pair of keys is used for encryption and decryption. The encryption unit 116 uses different encryption/decryption keys for each backup data block.

As the backup data generation unit 114 generates a backup copy, the encryption unit 116 generates a new encryption key and performs encryption on the new backup data using the new encryption key.

Alternatively, the encryption unit 116 may use same encryption/decryption keys for backup data having same expiration date. For example, if the backup data generation unit 114 generates twenty four (24) hourly snapshots and only one (1) snapshot is kept as a weekly snapshot, the encryption unit 116 may use same encryption/decryption keys for twenty three (23) snapshots and use different key for the other one (1) snapshot, so that the twenty three (23) hourly snapshots may be deleted at the same time by just deleting the common decryption key for the twenty three (23) hourly snapshots, which will be explained in detail hereinafter.

The encryption/decryption key is preferably separately stored and maintained in an encryption key storage 118. The encryption key storage 118 contains a list of the backup data blocks, related encryption and decryption keys necessary for encrypting and decrypting the backup data, and an expiration time for each backup data block.

Each backup data block is assigned an individual expiration time. The controller 112 monitors whether there is any expired backup data. If there is expired backup data, the controller 112 deletes the decryption key for the expired backup data from the encryption key storage 118, so that the encrypted backup data may not be decrypted in the future. The backup data itself may or may not be deleted. However, without the decryption key, the encrypted backup data is unreadable and therefore irretrievable.

Figure 3:
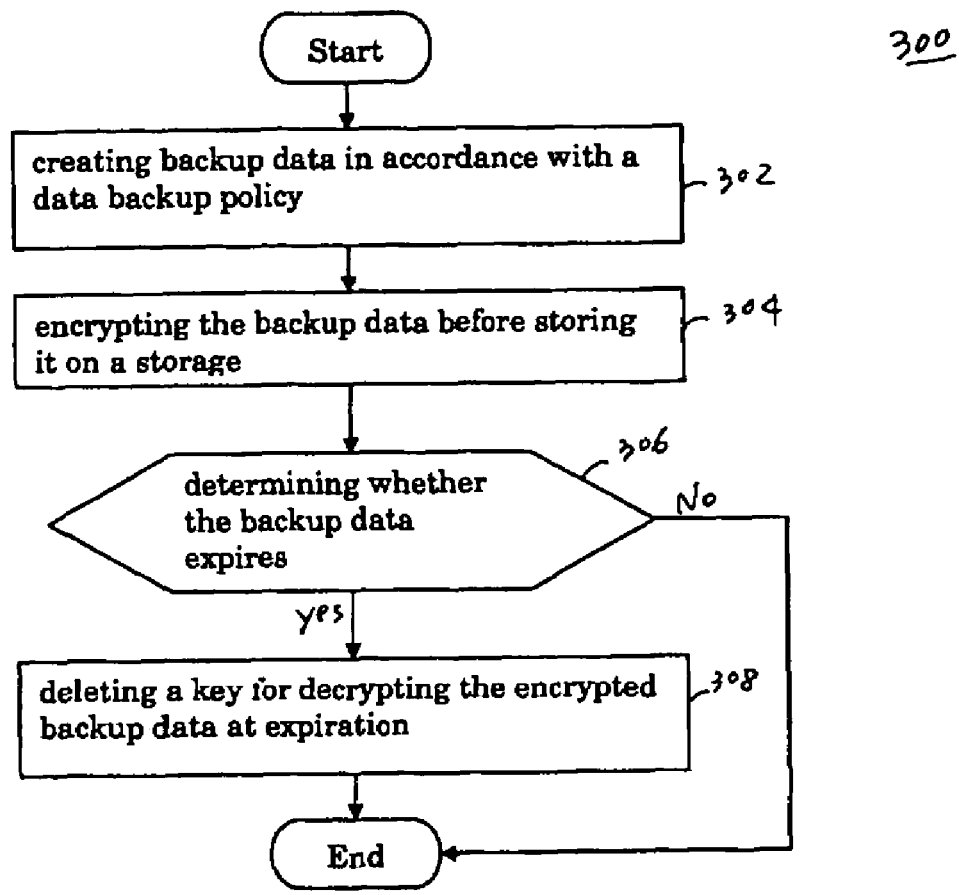
FIG. 3 is a flow diagram of process for deleting data upon expiration in accordance with the present invention.

A process 300 for data backup will be explained with reference to the flow diagram of FIG. 3. The process 300 deletes backup data efficiently upon expiration in accordance with the present invention. The backup data generation unit 114 creates backup data in accordance with a data backup policy (step 302). The encryption unit 116 encrypts the backup data before storing the backup data in storage (step 304). A controller 112 stores encryption/decryption key for the encrypted backup data along with an expiration time of the backup data in an encryption key storage 118. The controller 112 monitors whether there is an expired backup data (step 306). If the controller 112 identifies expired backup data, the controller 112 identifies a decryption key necessary for decrypting the expired backup data and deletes the key from the encryption key storage 118 (step 308). With this scheme, a data backup system can delete expired backup data efficiently, and the expired backup data is completely unrecoverable.

While specific embodiments of the present invention have been shown and described, many modifications and variations could be made by one skilled in the art without departing from the scope of the invention. The above description serves to illustrate and not limit the particular invention in any way. As stated hereinabove, the present invention may be applied to any data which needs to be deleted upon expiration, not just backup data, and any data generation system, not just backup systems, and it should be understood that such applications are obvious to those skilled in the art.

What is claimed is:

1. A method for managing expiration operations of a backup management system to render expired backup data inaccessible, the method comprising:
   generating backup data from original data contained in a primary data volume as indicated by a data backup policy, wherein the data backup policy governs generation, storage, and expiration of the backup data;
   storing the backup data in a backup storage unit and encrypting the backup data, wherein the backup data but not the original data is encrypted;
   storing a decryption key and an associated expiration time in an encryption storage unit for each of a plurality of backup data, wherein:
   the decryption key is for decrypting the encrypted data;
   the expiration time is indicated by the data backup policy and indicates the time at which each of the plurality of backup data should be rendered inaccessible;
   a first backup data and a second backup data of the plurality of backup data are assigned an identical decryption key when the first backup data and the second backup data have an identical expiration time;
   the first backup data and the second backup data are assigned distinct decryption keys when the first backup data and the second backup data have different expiration times; and
   deleting the decryption key at a time indicated by the expiration time for each of the plurality of backup data, such that an expired backup data becomes inaccessible even if the expired backup data is not deleted from the backup storage unit.

2. The method of claim 1 wherein the backup data is a snapshot of the original data.

3. The method of claim 1 wherein the backup data is a backup copy stored on a tape or a virtual tape.

4. The method of claim 1 wherein each backup data is encrypted using a different encryption key.

5. An apparatus for managing expiration operations of a backup management system to render expired backup data inaccessible, the apparatus comprising:
   a data generation unit to generate backup data from original data contained in a primary data volume, wherein a data backup policy governs generation, storage, and expiration of the backup data;
   an encryption unit to encrypt the backup data, wherein the encryption unit encrypts the backup data but not the original data;
   a backup storage unit to store the encrypted backup data;
   an encryption storage unit to store a decryption key and an expiration time for each of a plurality of backup data, wherein:
   the decryption key is for decrypting the encrypted data;
   the expiration time is indicated by the data backup policy and indicates the time and which each of the plurality of backup data should be rendered inaccessible;
   a first backup data and a second backup data of the plurality of backup data are assigned an identical decryption key when the first backup data and the second backup data have an identical expiration time;
   the first backup data and the second backup data are assigned distinct decryption keys when the first backup data and the second backup data have different expiration times; and
   a controller to delete the decryption key at a time indicated by the expiration time for each of the plurality of backup data, such that an expired backup data becomes inaccessible even if the expired backup data is not deleted from the backup storage unit.

6. The apparatus of claim 5 wherein the backup data is a snapshot of the original data.

7. The apparatus of claim 5 wherein the backup data is a backup copy stored on a tape or a virtual tape.

8. The apparatus of claim 5 wherein each backup data is encrypted using a different encryption key.

9. The apparatus of claim 5 wherein the backup data targeted to expire during the same period are encrypted using the same encryption key.

* * * * *